Patented Dec. 15, 1931

1,836,093

UNITED STATES PATENT OFFICE

EDWARD A. TAYLOR, OF CLEVELAND, AND WORTHINGTON T. GRACE, OF WILLOUGHBY, OHIO, ASSIGNORS, BY MESNE ASSIGNMENTS, TO THE GRASSELLI CHEMICAL COMPANY, OF CLEVELAND, OHIO, A CORPORATION OF DELAWARE

PROCESS OF PURIFYING SODIUM SILICATE SOLUTIONS

No Drawing. Application filed August 30, 1928. Serial No. 303,116.

The present invention relates to purification of sodium silicate solutions and to processes of precipitating unfilterable, finely divided material contained in such solutions, to render the same amenable to ordinary technical filtration operations.

Solid sodium silicate glass contains regularly small amounts of impurities, such as iron, aluminum, calcium and magnesium compounds, probably in the form of silicates which originate partly in the quartz, sand, and other raw materials used or which are obtained from the furnace walls by the action of the strongly alkaline silicate melt. Part of these impurities will dissolve together with the sodium silicate when a very concentrated solution is prepared, but some of these remain insoluble and form a suspension of more or less colloidal particles which either pass through filter cloth or form a slimy precipitate thereon, which rapidly clogs the pores of the filters and prevents further passage of the viscous silicate solution. Dilution of such turbid solutions below the concentration of commercial silicate solutions improves their filtering properties, but this requires subsequent concentration which is a rather expensive operation; this treatment is not entirely satisfactory as on further dilution more of the colloidal impurities are precipitated, resulting again in a turbid solution. It is, in many technical applications of sodium silicate, essential to use perfectly water-white solutions which will remain clear at any concentration.

We have found that the formation of these colloidal impurities is favored when the sodium silicate glass contains relatively high proportions of aluminum and iron, and particularly when they contain considerably more of these than of calcium salts.

We have now found that by precipitating an insoluble material in the silicate solution, the physical structure of the more or less colloidal impurities contained therein is modified in such a manner that they will settle out and are readily retained on a filtering medium without unreasonable clogging of the filter-cloth, and that the solutions obtained by such a treatment and subsequent filtration are perfectly clear and water white, and remain in this condition even if their concentration is changed by dilution or evaporation.

The formation of a precipitate in the silicate solution can be effected by adding thereto two materials which will react to form an insoluble precipitate, as, for instance, sodium sulfate and milk of lime. As a more convenient operation, we prefer to add the precipitating reagents together with the silicate glass into the dissolver which can be a rotating autoclave charged with the ingredients and water and dissolution effected by introduction of live steam. The colloidal impurities in the water glass are probably not dissolved in this procedure, but are obtained directly in a physical state which allows of easy settling and filtration.

Amongst the various precipitating agents we found the most effective to be calcium salts. Additions of quick lime or hydrated lime to the silicate dissolver charge result in the formation of insoluble calcium silicate which so modifies the iron and aluminum impurities that they will completely settle out in a few days, leaving a supernatent, clear liquor which is filter-pressed without difficulty. The amount of lime required is usually a fraction of 1% of the weight of the silicate.

A quicker settling and coarser precipitate is formed when sodium carbonate is added together with the lime and the silicate solution filters with great facility through filter-presses equipped with ordinary filter-cloth.

The action of these calcium salts is apparently entirely mechanical and serves to agglomerate and distribute the slimy iron and aluminum compound throughout the whole mass, forming a coarser grained non-porous filtercake, through which the viscous silicate solution passes readily.

The amount of hydrated lime and sodium carbonate needed to produce the best filterable silicate solution varies to a certain extent with the composition of the silicate and the amount of impurities contained in the glass, but will be usually below 1% of the weight of the glass. 0.20 lbs. hydrated lime and 0.295 sodium carbonate for each 100 lbs. of glass were found entirely satisfactory with a silicate in which the ratio of $SiO_2$ to $Na_2O$ was 3:1 and which was made from quartz sand containing 0.64% iron and aluminum oxide, 0.028% CaO and 0.029% MgO. Dissolved to a 40° Bé. solution, this glass, with the above additions, settled completely in about two days, and when filtered, even before settling, allowed the filtration of about 100,000 lbs. solution in less than 24 hours through a standard 36" plate and frame filter-press, producing a perfectly clear water-white silicate. Filtration without the addition of the lime and carbonate produces a slightly turbid solution, and even then it is necessary to clean out the press several times as the slimy precipitates quickly clog the filter-press and entirely prevent the passage of the solution.

We claim:

1. In a process of purifying a sodium silicate solution containing suspended insoluble impurities the steps of forming a precipitate of an alkaline earth metal salt within said solution and removing the combined insoluble and precipitate from said solution.

2. The process of claim 1 whenever the precipitate of alkaline earth metal salt is formed during dissolution of the sodium silicate in water.

3. In a process of producing a purified solution of sodium silicate which comprises dissolving water glass by the action of water and steam thereon, the steps of adding lime and a soluble carbonate to the charge of water glass and water, and removing the precipitate from the solution formed.

4. In a process of producing a purified solution of sodium silicate which comprises dissolving water glass by the action of water and steam thereon, the steps of adding less than 1% of hydrated lime and sodium carbonate, figured on the weight of the silicate, to the charge of water glass and water and removing the precipitate from the solution formed.

In testimony whereof, we affix our signatures.

EDWARD A. TAYLOR.
WORTHINGTON T. GRACE.